H. C. WAITE.
VEHICLE SPRING.
APPLICATION FILED APR. 23, 1914.
1,111,421.
Patented Sept. 22, 1914.
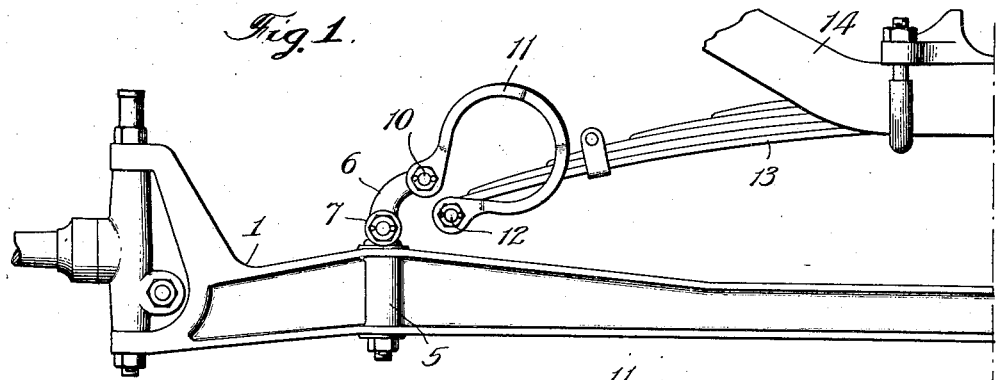
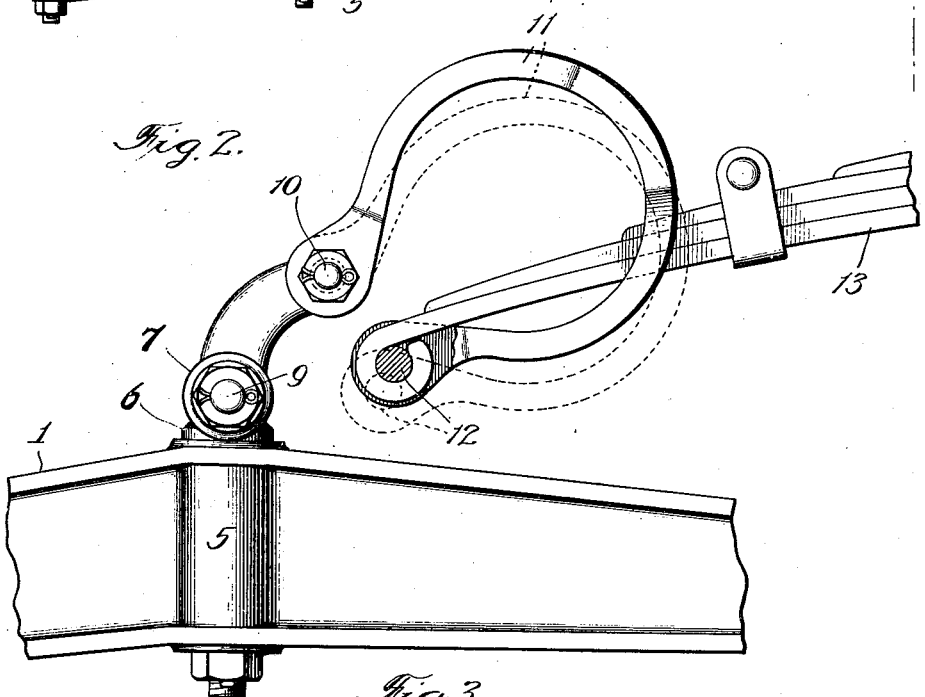
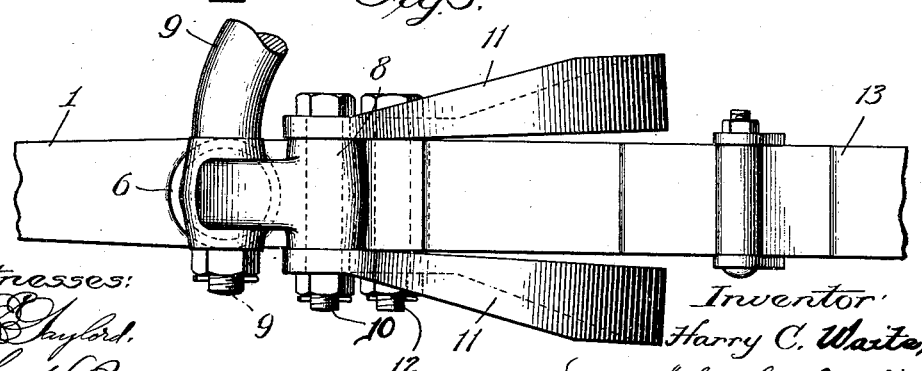
Witnesses:
Inventor
Harry C. Waite,

UNITED STATES PATENT OFFICE.

HARRY C. WAITE, OF CHICAGO, ILLINOIS.

VEHICLE-SPRING.

1,111,421. Specification of Letters Patent. Patented Sept. 22, 1914.

Application filed April 23, 1914. Serial No. 834,019.

*To all whom it may concern:*

Be it known that I, HARRY C. WAITE, a citizen of the United States, residing at Chicago, in the county of Cook and State of Illinois, have invented a new and useful Improvement in Vehicle-Springs, of which the following is a specification.

My invention relates to an improvement in vehicle-springs, which I have devised for supplementing the action of the spring ordinarily used for supporting the vehicle-body on the axle, particularly in an automobile. In fact, my improvement was immediately devised for application to the type of automobile known as the "Ford Model T", and it is in successful operation on my own car of that model, with reference to which I prefer to describe it to facilitate the explanation hereinafter contained of its operation; though it is not my purpose to be understood as intending to limit the application of my improvement to any particular type of vehicle.

In the accompanying drawing, Figure 1 is a broken view in front elevation showing my improvement in its application to the forward axle and body-supporting spring in an automobile of the type above specified; Fig. 2 shows the same on a larger scale and illustrates by dotted representation the action of the supplemental spring, and Fig. 3 is a broken plan view of the showing in Fig. 2.

Only one half of the axle 4 is illustrated to show my improvement on one end, but it will be understood that the other half is similarly equipped. In a sleeve-like bearing 5 formed on the axle is supported and secured at its straight section an arm 6 having an upper curved section formed with a lower transverse tubular bearing 7 and a similar bearing 8 on its upper end. In the bearing 7 is secured, as usual, the member 9 and in the bearing 8 is fastened a pivot-bolt 10. Similar bowed C-shaped springs 11, 11, each formed of one piece of spring metal having its ends provided with eyes and widening therefrom toward its center to strengthen it toward the point at which the greatest strain is to be resisted, are fastened at corresponding eyes on the opposite ends of the pin 10. In the opposite eyes of the two springs is supported a pin 12 on which bears one end of the leaf-spring 13 having secured to it, midway between its ends, the usual yoke 14 for carrying the vehicle-body (not shown).

The equipment may be the same, or substantially the same as that described, for the rear axle.

The stiffness of the spring 13 is such as to cause it to yield and perform its resilient function only when the vehicle is more or less heavily loaded, so that when lightly loaded the vehicle rides without due resiliency. To overcome this objection, I provide the springs 11 of a relatively lesser stiffness than the leaf-spring 13, whereby they will yield resiliently under a comparatively light load (say that of one passenger where the weight of four or five passengers is required to bend the spring 13). With such a light load its weight, carried through the medium of the spring 13 on the opposite pairs of springs 11, which turns them on their pivots 10 from the full line to the dotted-line position illustrated in Fig. 2, spreads their ends against which the leaf-spring bears away from their opposite ends, thereby putting the springs 11 under tension to resiliently ride the vehicle. When the load is so great as to cause the spring 13 to yield it will have put the springs 11 under the maximum tension required of them to cause the spring 13 to act resiliently, and in that way supplement the function of the latter.

By duplicating the springs 11 on each end of the spring 13, to embrace the latter between them, they tend to prevent longitudinal swaying of the vehicle-body in motion, and the widening construction of the supplemental springs to a point midway between the ends of each tends to stiffen them transversely to adapt them to resist more effectively the swaying tendency referred to.

What I claim as new and desire to secure by Letters Patent is—

1. In combination with a vehicle-axle and a spring for carrying thereon the vehicle-body, a pair of bowed C-shaped springs pivotally supported on the axle near each end thereof, the members of each pair carrying on their free ends and embracing said spring at one end with the opening of the C extending away from the body of the spring.

2. In combination with a vehicle-axle and a spring for carrying thereon the vehicle-body, bowed C-shaped springs pivotally supported at one end in pairs on the axle near each end thereof with the opening of the C extending away from the body of the spring, the members of each pair having at their free ends a pin-connection on which said spring is carried and embraced at one end between said members.

3. In combination with a vehicle-axle and a spring for carrying thereon the vehicle-body, bowed C-shaped springs widening from their ends toward their centers and supported at one end in pairs on the axle near each end thereof, the members of each pair having at their free ends a pin-connection on which said spring is carried and embraced at one end between said members.

HARRY C. WAITE.

In presence of—
 N. B. DEARBORN,
 O. C. AVISUS.